US007350282B2

(12) United States Patent
Tally et al.

(10) Patent No.: US 7,350,282 B2
(45) Date of Patent: Apr. 1, 2008

(54) TOOL FOR DISCONNECTION OF TUBING FROM A COUPLING

(75) Inventors: Kevin L. Tally, Clarinda, IA (US); Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 175 days.

(21) Appl. No.: 11/169,181

(22) Filed: Jun. 28, 2005

(65) Prior Publication Data

US 2006/0042063 A1 Mar. 2, 2006

Related U.S. Application Data

(63) Continuation-in-part of application No. 11/032,842, filed on Jan. 11, 2005, now abandoned.

(60) Provisional application No. 60/605,027, filed on Aug. 27, 2004.

(51) Int. Cl.
*F16L 35/00* (2006.01)

(52) U.S. Cl. .......................................................... 29/237

(58) Field of Classification Search .................. 29/237, 29/272, 235, 258; 294/99.1, 99.2, 33
See application file for complete search history.

(56) References Cited

U.S. PATENT DOCUMENTS

| | | | | |
|---|---|---|---|---|
| 4,055,359 | A | 10/1977 | McWethy | |
| 5,084,954 | A * | 2/1992 | Klinger | 29/237 |
| 5,226,230 | A * | 7/1993 | Klinger | 29/237 |
| 5,370,423 | A * | 12/1994 | Guest | 285/39 |
| 5,455,995 | A | 10/1995 | Pool | |
| 6,195,862 | B1 * | 3/2001 | Chang | 29/237 |
| 7,127,787 | B2 * | 10/2006 | Whitehead | 29/237 |

OTHER PUBLICATIONS

Integrated Supply Network, Inc. catalog, vol. 3 Issue 8; Aug. 2004.

* cited by examiner

*Primary Examiner*—Robert C. Watson
(74) *Attorney, Agent, or Firm*—Banner & Witcoff, Ltd.

(57) ABSTRACT

A tool for uncoupling tubular connections includes a pair of bifurcated arms joined together by an integral, arcuate, bridge member wherein the bifurcated arms of the tool include ends mounted transversely on the arms in opposed relation.

3 Claims, 2 Drawing Sheets

FIG.1
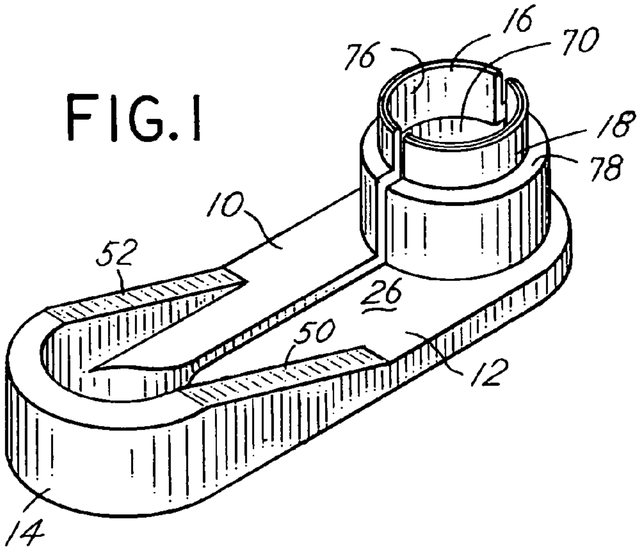
FIG.2
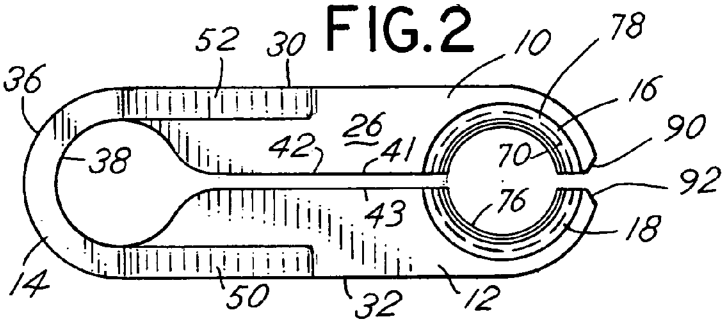
FIG.3
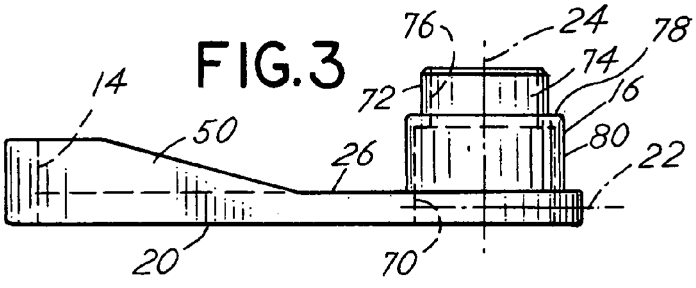
FIG.5
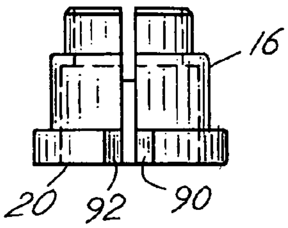
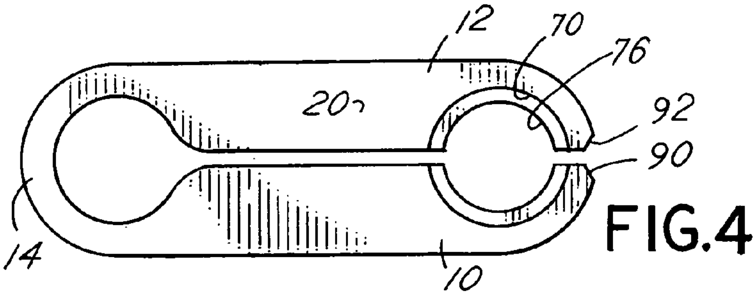
FIG.4

TOOL FOR DISCONNECTION OF TUBING FROM A COUPLING

CROSS REFERENCE TO RELATED APPLICATION

This is a continuation in part utility application based upon provisional application entitled Tool for Disconnection of Tubing from Coupling, Ser. No. 60/605,027 filed Aug. 27,2004 and the subsequently filed utility application Ser. No. 11/032,842, filed Jan. 11, 2005 now abandoned entitled Tool for Disconnection of Tubing from Coupling for which priority is claimed and which are incorporated herewith by reference.

BACKGROUND OF THE INVENTION

In a principal aspect the present invention relates to a tool which may be utilized to disconnect coupled tubing of the type commonly used in the automotive industry particularly transmission cooler lines in certain vehicles.

In U.S. Pat. No. 5,455,995 entitled “Tool for Uncoupling Quick Connect Tubular Couplings”, there is disclosed a tool which is useful to disconnect tubular coupling constructions, for example, couplings of the type disclosed in U.S. Pat. No. 4,055,359. Also disclosed in U.S. Pat. No. 4,055,359 is a tool which may be used for disconnecting such coupling arrangements. The invention claimed in U.S. Pat. No. 5,455, 995 is an improved disconnect tool which is useful for disconnecting couplings of various sizes.

More recently in U.S. Pat. No. 6,195,862 B1 entitled “Tubular Disconnect Tool with Angled Semi-Annular Heads” there is disclosed another type of tool which is useful for disconnecting or decoupling tubing connections. U.S. Pat. No. 6,195,862 B1 is incorporated herewith by reference. In this patent, there is disclosed the utilization of first and second pivotally joined arms which are biased by a separate elastic member to cause the two arms to come together so that the semi-cylindrical head mounted on the end of each arm may fit over a tube and then be engaged with a tube coupler in a manner which will effect decoupling. This patent teaches that there should be an angular relationship between the decoupling tube engagement end of the tool and the pivoting, connection leg of the tool. The two legs of the tool are individually molded from a polymeric material and biased toward one another by an elastic band wrapped around the legs.

While such a device has worked successfully, there are environmental problems which potentially affect this tool. That is, an elastic member such as a rubber band is utilized to cause the separate jaws or legs of the tool to be biased toward one another. The rubber tends to degrade in a workplace environment and, as a result, the tool may be difficult to manipulate or may fail to achieve its intended function. For these and other reasons, an improved decoupling tool has been sought.

SUMMARY OF THE INVENTION

Briefly, the present invention comprises a tubing disconnect tool which is made from a molded plastic material, such as acetal polymeric or resin, and which is comprised of a single molded element incorporating a pair of elastically connected, bifurcated arms with spaced, semi-cylindrical shaped tube engaging, decoupling ends. The opposite end of the tool comprises a generally arcuate, integral, elastic biasing member which connects the bifurcated arms. Each arm is planar along its length between the decoupling ends and the connecting arcuate end. The articulated at an included obtuse angle with respect to the decoupling end. The arcuate connecting end is configured in a manner which facilitates the case of tool manipulation and tool strength.

Thus, it is an object of the invention to provide an improved tube decoupling tool.

It is a further object of the invention to provide an integrally molded, unitary decoupling tool.

Another object of the invention is to provide a decoupling tool which includes an end, for engaging the tubing that is to be decoupled, formed on arms that are transverse with respect to an opposite end wherein an elastic biasing link, element or arcuate connecting end connects the arms, said biasing element being integrally molded with the biasing arms.

Another object of the invention is to provide an improved decoupling tool which may be easily color coded.

Another object of the invention is to provide a decoupling tool which may be manufactured in a manner which provides for an elastic connection between the arms of the tool wherein the elasticity is adjustable depending upon the size of the tool and other factors associated with the use of the tool.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is an isometric view of the tool of the invention;

FIG. 2 is a top plan view of the bottom side of the tool of FIG. 1;

FIG. 3 is a side view of the tool of FIG. 1;

FIG. 4 is a bottom plan view of the tool of FIG. 1;

FIG. 5 is an end view of the tool of FIG. 4 as viewed from the right hand side of FIG. 3;

DESCRIPTION OF THE PREFERRED EMBODIMENT

Figure 6:
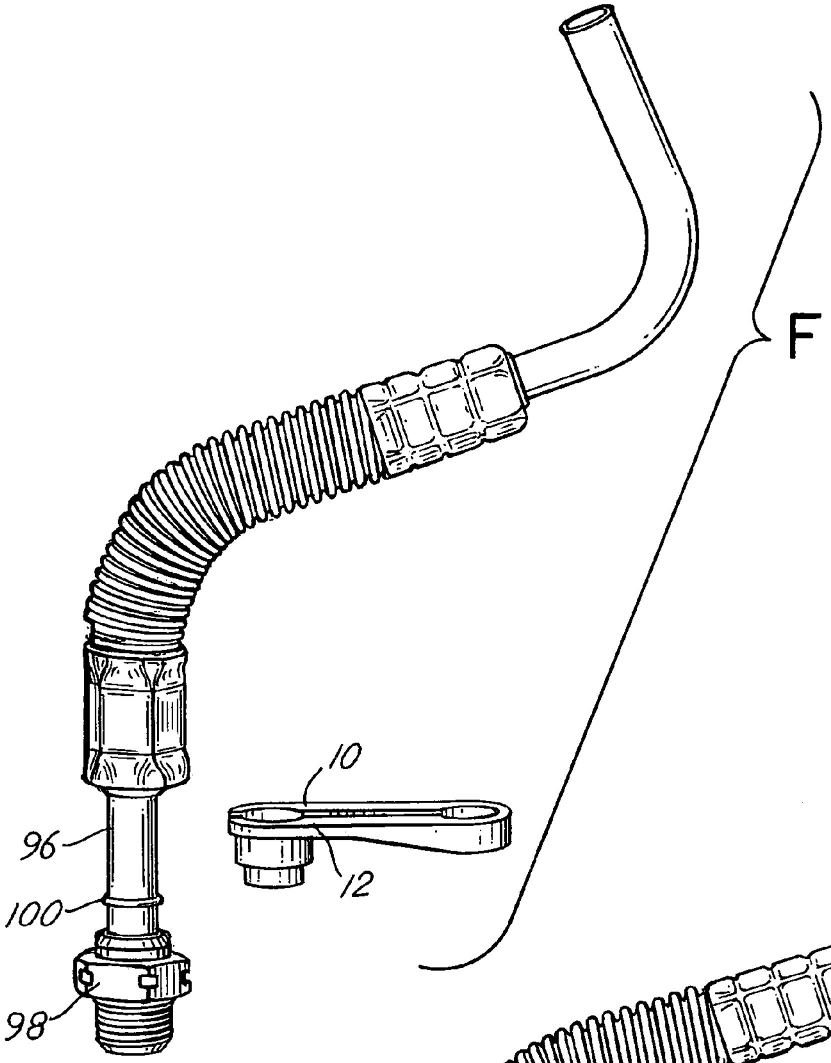
FIG. 6 is an isometric view of the tool positioned to engage a coupler.

The tool of the invention is comprised of an integrally molded element manufactured, for example, from an elastic polymeric material such as Delrin® acetal resin a trademarked product Dupont. Other polymerics may be used however. The tool may be made in a series of different sizes. A typical size is designed for a ⅜ inch tubing coupler or a ½ inch tubing coupler. The tool is especially useful for decoupling couplers of the type used in various motor vehicle cooling systems, for example, a Ford Motor Company oil cooling system. Each size of the tool thus is designed for utilization with specifically sized tubing and an associated tubing coupler. In other words, each tool is designed to be utilized to effect disconnection of a particular diameter size tubing from connection with other tubing or a port of a device connected with the tubing wherein the tubing is connected by means of a coupler generally of the type described in the Background of the Invention.

Referring to the figures, the tool is comprised of a first molded arm 10 and a generally mirror image, second molded arm 12 parallel to and spaced from the first arm 10. The arms 10 and 12 are connected to one another by an arcuate, generally cylindrical connection section 14. At the opposite end of each of the arms 10 and 12 and extending transversely thereto, are generally semi-cylindrical, projecting tubular sections 16 and 18 respectively. The tubular sections 16 and 18 are arranged in opposed relation to one another.

The tool of the invention is fashioned and molded in a manner which provides for utilization thereof within the tight confines of motor vehicle engine compartments by way of example. The tool is thus designed for strength yet flexibility and it is sized in a manner which promotes ease of access in situations where access is restricted.

Each of the arms 10 and 12 includes a flat, planar lower surface 20 extending the total length of each arm 10, 12. A generally centerline axis 22 is parallel to the planar surfaces 20 and extends in the direction of arms 10, 12. Transverse to the axis 22 is an axis 24 which is the access of rotation of the semi-cylindrical sections 16 and 18. Each of the arms 10 and 12 further includes a generally planar top face or surface 26 parallel to and spaced from the bottom face or surface 20. A typical dimension associated with distance between bottom face 20 and the top face 26 is approximately 0.15 inches. A typical dimension of the extension of the semi-cylindrical sections 16 and 18 from the surface 26 is in the range of 0.55 to 0.60 inches with a preferred range or dimension being approximately 0.58 inches.

The arms 10 and 12 include a lateral outside surface 30 and 32 respectively. These lateral outside surfaces 30 and 32 are generally parallel to one another and extend along the length of each of the arms 10 and 12 from their opposite ends. The arms extend axially in the range of 2 to 3 inches and preferably about 2.6 inches. The parallel faces of lateral sides 30 and 32 define the outer side limits of the tool and thus the semi-cylindrical sectors 16 and 18 are between those outside surfaces 30 and 32.

The outside surfaces 30 and 32 connect with an arcuate, generally semi-cylindrical connection bridge, sector or section 14 and do so as tangential extensions of a semi-circular arc having an outer face 36. The distance or dimension between the lateral side surfaces 30 and 32 is on the order of 1 inch or less. The diameter of the arcuate face 36 is substantially the same as the dimension of the distance between the lateral sides 30 and 32.

The arcuate section 14 has a generally uniform thickness between outer face 36 and an inner face 38. That thickness is in the range of 0.125±0.05 inches. The height dimension of the arcuate section 14 is illustrated in FIG. 3 as the distance between the bottom face 20 and a top face 40 of the arcuate section 14. This dimension is in the range of 0.40±0.05 inches in the embodiment shown. This thickness of this arc or section 14 is constant for the full semi-circular run of the arcuate section 14. The arcuate section 14 thus defines a circular or generally semi-circular face 38 which connects with a slit 42 defined by opposed inner faces 41, 43 of the arms 10 and 12. The dimension of the inner slit 42 is in the range of 0.0625 inches±0.005 inches.

The tool in its rest position or unbiased position is depicted in FIG. 2. Thus, the arcuate section 14 may be biased by spreading the arms 10 and 12 to enlarge the slit 42.

The arcuate section 14 is connected by lateral side filets 50 and 52 to the top planar face 26. The width of the filets 50 and 52 is the same as that of the arcuate section 14. The construction of the filets 50, 52 is an important feature of the invention inasmuch as since the arcuate section includes the filets 50, 52 an efficient means for a manual gripping of the tool is provided and further a means is provided for strengthening of the tool so that it does not bend in an undesired manner when being utilized for decoupling. Thus, the relative dimensions and the relative ratio of those dimensions for the component parts described becomes an important feature of the invention to achieve the functional objectives. The dimensions set forth may be altered or amended but should generally do so in a ratio corresponding to the dimensions set forth and described. The filets 50 and 52, for example, extend toward the decoupling sectors 16 and 18 approximately to the midpoint of the distance between the opposite ends of the tool.

The decoupling sections 16 and 18 also have a unique construction when taken in combination with the other aspects of the invention as described. That is, the sectors 16 and 18 define or include a counterbore 70. The counterbore 70 has an internal diameter greater than the external diameter 72 of an outside face of the semi-cylindrical sector 74 of the decoupling sections 16 and 18. This is necessary in order to engage the tool properly over projecting ribs that are associated with couplers of the type on which the tool is being utilized. On the other hand, the sectors or sections such as the outer section 74 must have an internal diameter 76 and an external diameter 72 which will enable the sectors 16 and 18 to be properly inserted within a coupler to effect appropriate disconnection of the coupler by engaging the coupler and the springs therein in a proper fashion. Further, there is a land or ledge 78 between the outer or upper sections 74 and an inner or lower sections 80. This land provides a feel during tool use and functions to limit the insertion of the decoupler tool when it is being used.

The extreme end of each of the bifurcated arms 10 and 12 include a pair of faces 90, 92 outwardly inclined at an obtuse angle. Faces 90, 92 typically intersect at an angle of approximately 120 degrees. These faces 90, 92 lead into the slit 42. These faces 90, 92 facilitate pushing of the tool onto a tube in order to fit the semi-cylindrical sectors 16 and 18 around a tube. Thus, these faces 90 and 92 facilitate bifurcation or splitting of the arms 10 and 12 and fitting of the decoupling mechanism onto tubing to engage a coupler that is to be decoupled.

Figure 7:
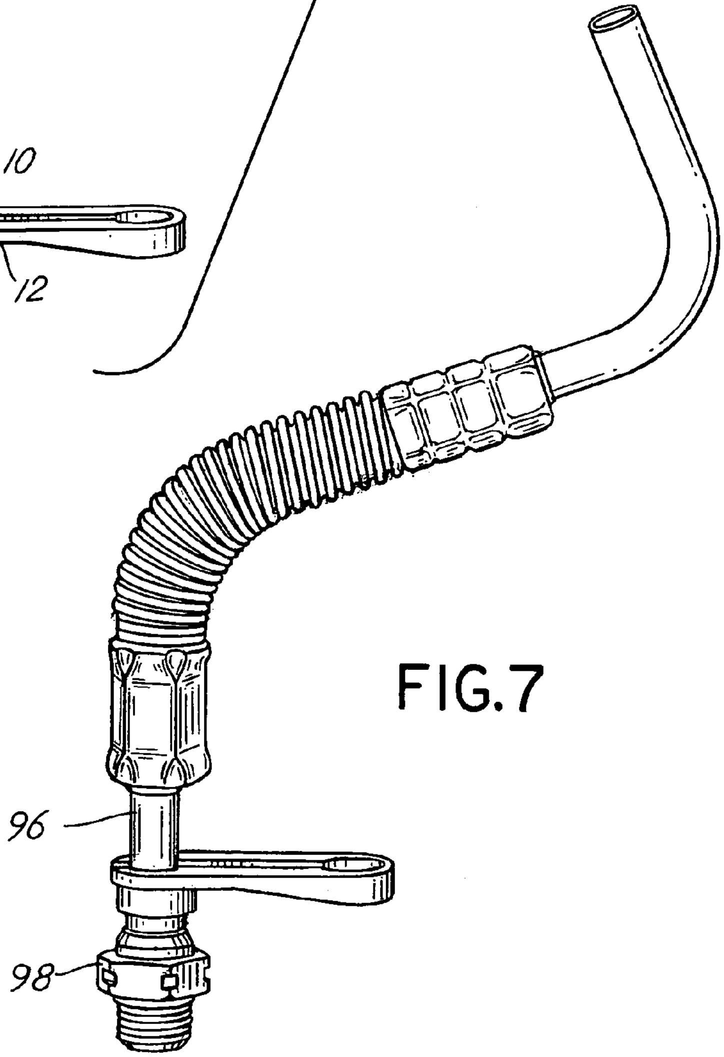
FIG. 7 is an isometric view of the tool engaging a coupler.

FIGS. 6 and 7 illustrate the typical method of use of a tool of the type described may be utilized. Referring to those figures, tubing 96 is engaged by means of a coupler 98 to an automotive cooling system, for example. The tubing 96 includes a raised rib 100. The decoupler tool must be positioned on the tubing 96 in order to move longitudinally along the tubing to engage the coupling 98 to effect disconnection. The counterbore 70, previously described, makes it possible to fit the tool onto the tubing with appropriate clearance for the rib 100 and then ultimate manipulation of the tool as depicted in FIG. 7 longitudinally into engagement with the coupler 98 to effect release of the coupler 98 by means of the tool. Thus the semi-cylindrical sectors 16 and 18 can be properly positioned into the annular space surrounding the coupler between the coupler and the tubing 96 to effect decoupling by means of the tool of the invention. The design and shape of the connection end 14 of the tool including the filets provides for adequate strength yet flexibility of the tool to effect decoupling.

While there have been set forth specific examples of the tool it is to be understood that the tool construction is to be limited only by the following claims and equivalents thereof.

What is claimed is:

1. A unitary, molded tube coupler release tool comprising, in combination:

a first elongate, generally straight arm, having an intermediate section, an outer connection end at one end, an integral opposite decoupling tool end at the opposite end, a top side, a bottom side, and an outer side;

a second arm with an outer connection end an intermediate section and an integral, opposite decoupling end comprising a generally mirror image of the first arm, the top sides and bottom sides being generally coplanar;

said first arm and said second arm being coplanar with the outer connection ends joined by an integral generally arcuate, semi-circular elastic connection member at the connection end which maintains the arms in opposed, aligned position separated by a straight line, linear slit when the tool is in an unbiased, rest condition;

said first and second decoupling tool ends each including an opposed, generally semi-cylindrical projection section projecting transversely from the top side plane of said tool end, said semi-cylindrical sections in opposed relation and separated by said slit with said first and second arms in the rest condition, said semi-cylindrical sections, in combination, characterized by an external diameter for engagement with a tube coupling mechanism to facilitate disengagement of said coupling mechanism;

said connection member characterized by a generally semi-circular arcuate configuration having an outer diameter substantially equal to the outer dimension spacing of the first and second arms transverse to slit;

said connection member having a dimension between the bottom side and the top side approximately two times the dimension between the bottom side and top side of the intermediate section, said connection member further including first and second reinforcing filets extending from the connection member to the intermediate section; and said semi-cylindrical sections at the first and second decoupling ends each including an outside surface having a larger diameter section adjacent the top surface, and a lesser diameter section adjacent the larger diameter section with a flange between the sections, and forming a counterbore in combination, said counterbore having a radius greater than the radius of the outside surface of the lesser diameter section.

2. The tool of claim 1 wherein the tool comprises a unitary molded plastic material.

3. The tool of claim 1 wherein the bottom side of each arm is a flat, planar surface.

* * * * *